May 12, 1964   H. W. SCHAEFER ETAL   3,133,003
METHOD FOR CONTROLLING THE GROWTH RATE OF MICROORGANISMS
Filed Feb. 7, 1961   2 Sheets-Sheet 1
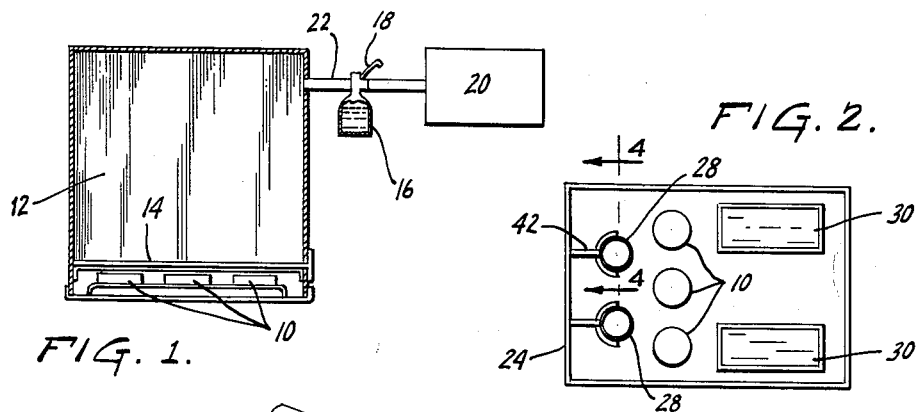
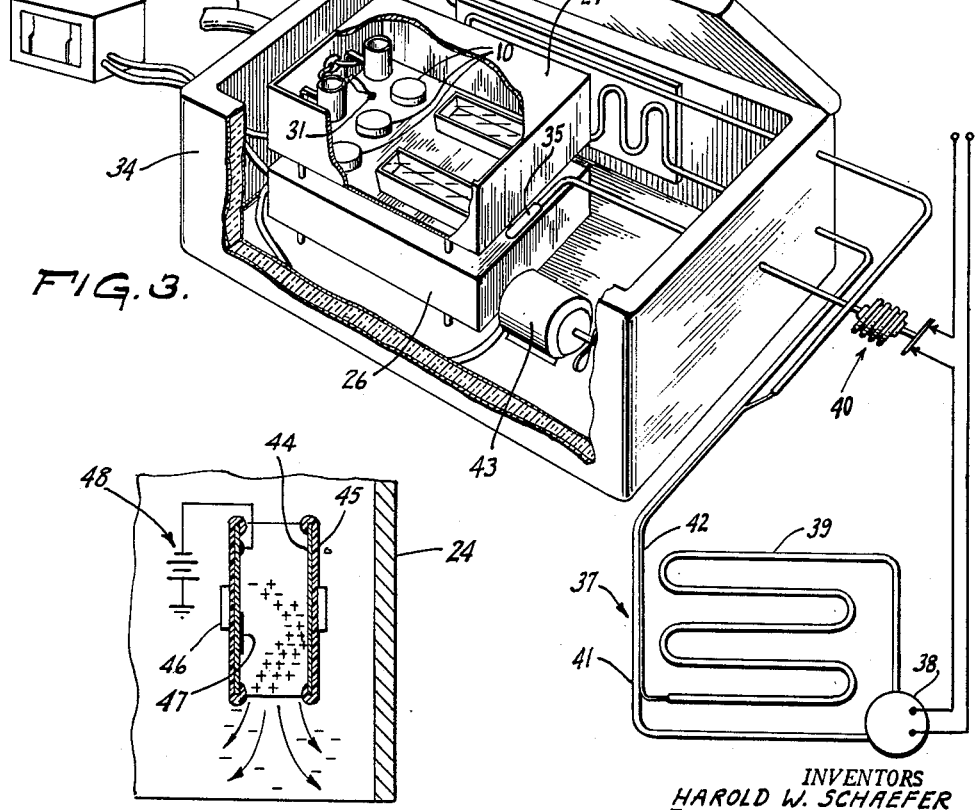
INVENTORS
HAROLD W. SCHAEFER
FORREST P. SPEICHER
BY
AGENT May 12, 1964  H. W. SCHAEFER ETAL  3,133,003
METHOD FOR CONTROLLING THE GROWTH RATE OF MICROORGANISMS
Filed Feb. 7, 1961  2 Sheets-Sheet 2
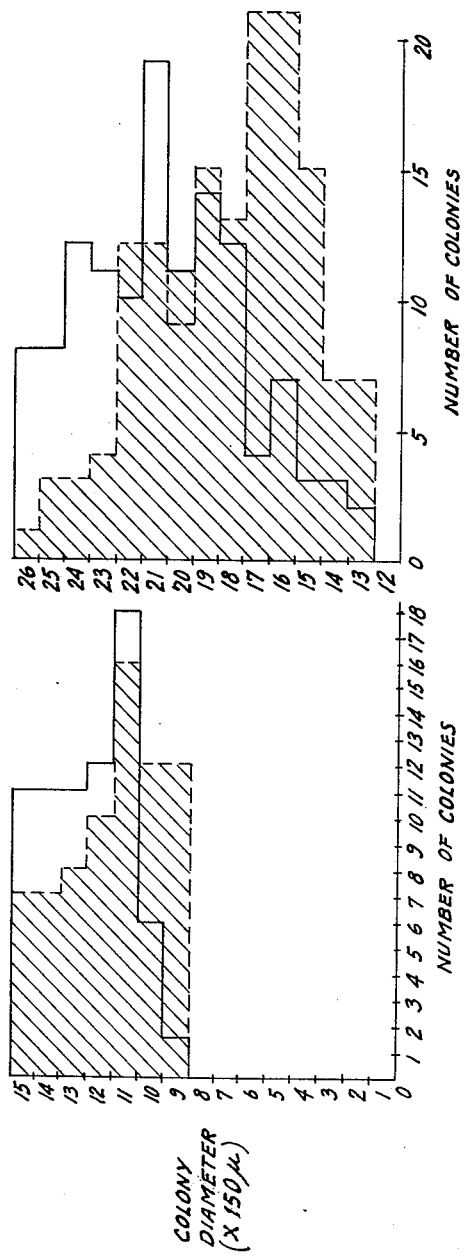
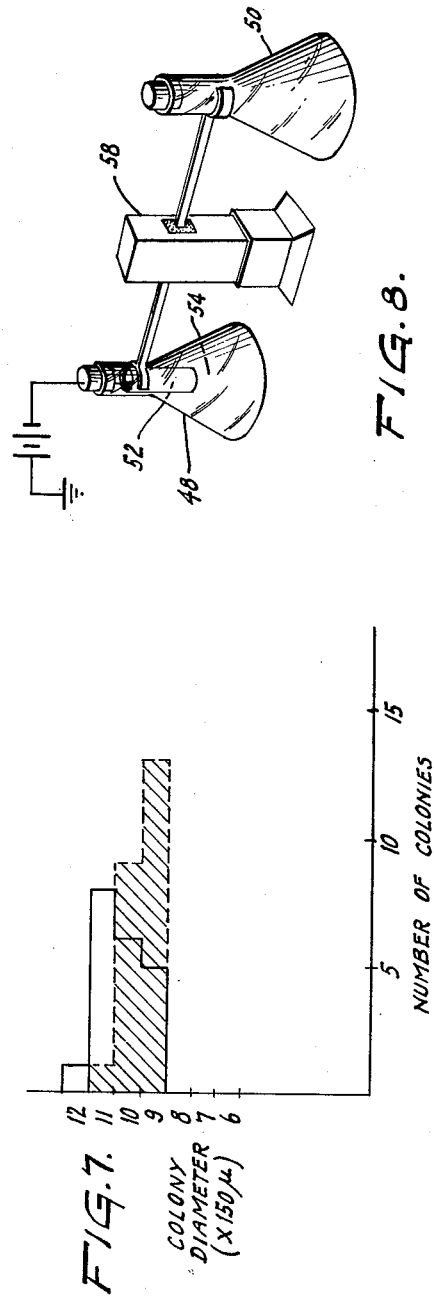
INVENTORS
HAROLD W. SCHAEFER
FORREST P. SPEICHER
BY
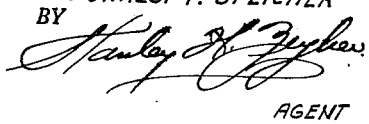
AGENT 3,133,003
METHOD FOR CONTROLLING THE GROWTH
RATE OF MICROORGANISMS
Harold W. Schaefer, Philadelphia, and Forrest P. Speicher, Havertown, Pa., assignors, by mesne assignments, to Philco Corporation, Philadelphia, Pa., a corporation of Delaware
Filed Feb. 7, 1961, Ser. No. 87,620
3 Claims. (Cl. 195—81)

This invention relates to the field of microbiology and more particularly to a method for controlling the growth rate of microorganisms.

Briefly stated this invention relates to a technique for affecting the growth rate of microorganisms by subjecting the microorganism to an atmosphere having a preponderance of artificially created negative ions.

The invention has wide utility, for example as a research tool and in the field of industrial microbiology, wherein microorganisms are employed in the biosynthesis of desired end products.

Numerous factors influence the growth rate of microorganisms. For example, it is known that the growth rate is dependent upon the nature and quantity of the nutrient substances on which the microorganism feeds, the temperature of incubation (most substances have a specific temperature or range of temperatures at which a maximum rate of growth occurs, herein termed optimum temperature), oxygen concentration of the ambient environment and numerous other factors. Thus far, however, there has been no recognition that the growth rate of microorganisms may be controlled by subjecting them to a preponderance of negative atmospheric ions.

While it is desirable in applications dependent upon the growth rate of microorganisms to subject the organism to optimum temperature conditions there are numerous situations in which this is not feasible. It is in these latter situations that one phase of the invention has optimum utility.

It is accordingly a principal object of this invention to provide a unique method for controlling the growth rate of certain designated microorganisms.

It is another object of this invention to provide a method for stimulating the growth rate of microorganisms while maintaining them at temperatures which, while required for certain purposes, are below those necessary to sustain optimum growth of the microorganisms.

These and other objectives within contemplation will be more fully understood from a consideration of the following detailed description taken in conjunction with the accompanying drawings, in which:

FIGURE 1 is a sectional side view of a test chamber of the type used in spray inoculation;

FIGURE 2 is a plan view of an ion chamber showing the general arrangement of apparatus employed in carrying out the research phases of this invention;

FIGURE 3 is a cut-away perspective view of a chamber or chest used in maintaining desired temperature conditions and ion concentrations;

FIGURE 4 is a sectional view taken along the cutting plane 4—4 shown in FIGURE 2 illustrating the detailed construction of one form of ionizing chamber;

FIGURES 5 through 7 are graphs illustrating the results obtained utilizing the method and apparatus concepts of this invention; and FIGURE 8 shows another form of test arrangement for using negative ionization to affect the growth rate of mold grown in liquid nutrient media.

Numerous experiments were conducted to show that the growth rate of various species of microorganisms was stimulated by being subjected to an artificially created negative-ion environment. The specimens utilized in the laboratory experiments comprised organisms whose colonial morphology is substantially circular and exhibit an entire margin, a material aid in quantitative analysis. To insure against contaminated colony precursors specimens were obtained from the American Type Culture Collection, herein abbreviated ATCC. Extreme care was exercised throughout the numerous tests to obviate any extrinsic stimuli and rigid control was maintained throughout as to all operational parameters. A typical test procedure employed to demonstrate the effect of negative ionization on a microorganism is that which was used in connection with the bacterium *Sarcina lutea*, a typical representative of the genus Sarcina.

A pure culture of this bacteria was obtained from ATCC and used to inoculate a nutrient broth consisting of a liquid mixture of beef extract and peptone. Inoculation was effected by aseptically transplanting a small quantity of bacteria from this pure culture to the broth by means of an inoculation needle. In accordance with conventional practice the inoculated broth or culture was then incubated at a temperature approaching the optimum for the particular species involved. In the case of *Sarcina lutea* this temperature is approximately 25° C. This procedure insures bacterial precursors of sufficient strength to survive the rigors of spray inoculation, a technique described below.

The culture after incubation is then employed as the inoculant for seeding a thin layer of nutrient (Difco) agar deposited on Petri plates 10 disposed within the spray chamber 12. Overlying the plates 10 is a removable, imperforate plate 14. The inoculant to be used for seeding is placed in a spray gun 16 and is released into the chamber 12 by operation of the associated valve mechanism 18. On energization of this valve, the inoculant is entrained in a stream of compressed air emanating from the compressor 20 and passes by way of conduit 22 into the chamber 12. The atomized culture was allowed to settle for approximately 15 minutes before removing plate 14. This allows the larger globules of the inoculant to settle out of suspension and any air turbulence, created by injection of the inoculant, to subside. On removal of plate 14 the dishes 10 are exposed to a fine, uniform mist of inoculant. After an exposure of approximately 50 seconds the dishes were taken from the chamber and capped. Repeated tests employing the spray inoculation technique resulted in a uniformity of seeding (per unit of area) within a tolerance of ±3%. To provide a control against which to measure the test results half the seeded dishes were placed in an ion chamber 24 (FIGURES 2-4) and the other half in an identically constructed chamber 26. The construction of these chambers as illustrated in FIGURE 2 comprised a generally rectangular plywood enclosure approximately 21.5 inches long, 11.5 inches wide and 15 inches deep, each containing a plurality of ionizers 28 and water trays 30. The purpose of the water trays was to maintain constant humidity conditions within the ion chamber. The temperature within each of the chambers was continuously monitored by means of thermocouples 31, only one of which is shown, positioned within the enclosure and connected to a recording potentiometer 32. The power necessary to operate the ionizers in chamber 24 was brought in by means of the insulated cable 33.

To maintain identical temperatures within the chambers 24 and 26 they were placed within an insulative, thermostatically controlled enclosure 34 equipped with a highly sensitive feeler bulb or thermostat 35. Disposed within the enclosure is an evaporator plate 36 which forms part of a refrigerating system 37 including a motor-compressor 38 and condenser 39. The cycling of the motor-compressor is controlled by means of the bellows-actuated switch 40 operated by the feeler bulb 35 maintained in heat exchange relation with the air within enclosure 34 contiguous the chambers 24 and 26. The outlet of the evaporator 36 communicates through suction line 41 with the inlet side of the motor-compressor 38, the outlet side of which is connected to the condenser 39. The condenser discharges into a capillary tube 42 which, as is customary, has a portion arranged in heat exchange relation with the suction line 41. A fan 43 was employed to maintain uniform circulation of air within the enclosure. With the chambers in place the dish covers were removed and the ionizers in chamber 24 energized. The ionizers in chamber 26 were left inactive, this latter chamber, as mentioned above, serving as the control. The construction of the ionizers 28 used in these tests is shown in cross sectional detail in FIGURE 4. Each unit comprises a metal tube 44 provided with an outer sleeve or covering 45 of electrically insulative material and is supported within the enclosures 24 and 26 by means of bracketry 46. The tube has secured to an inside wall portion thereof a strip of radioactive polonium foil 47. Alpha emission from the polonium produces a zone of intense ionization in the immediate vicinity of the radioactive material.

A suitable source 48 of relatively low voltage electrical potential (e.g., 300 volts) has its positive terminal connected to the metal of the inside wall portion, the inside of the tube being open to the compartment 24 but the tube being electrically insulated from the walls of that compartment. This results in maintaining an electrostatic field between the tube and ground. The potential difference of about 300 volts was maintained throughout the tests. Ionization in this instance is produced by alpha particles colliding with air and water vapor molecules to create both positive and negative ions. By means of the unipolar charge maintained on the metal plate 44 the plate is made to attract ions with an opposite charge and repels atmospheric ions with a like charge. To generate a preponderance of negative ions, the plate is charged negatively. There should exist in the chamber a great preponderance of negative ions, a concentration of about 100,000 ions per cubic centimeter of air within the chamber being suitable. It is of course possible to introduce an ion concentration so high as to become lethal. In practicing the invention to achieve increased growth rates, such lethal concentrations should of course be avoided.

It should be understood however that the present invention is not concerned with the ion emitter per se—which is of known type—except insofar as it cooperates as a part of the overall combination.

Within the purview of this invention other means may be utilized to produce atmospheric ions, the general requirements for such means being that the apparatus should be simple and inexpensive, and that operation thereof should produce no objectional or dangerous by-products.

The test specimens of Sarcina lutea were incubated for three days at a temperature of 22° C., this being three degrees below optimum temperature for the species. All environmental conditions throughout the test, with the exception of the ion content of the ambient air, were identical as to the containers 24 and 26. At the completion of the test the specimens were taken from their respective chambers and examined under a 100 power microscope. By means of a calibrating slide set in the ocular disk of the eye piece, in conjunction with a micrometer disk, the precise diameter of the bacterial colonies was determined. FIGURES 5 and 6 graphically illustrate the results of these experiments. The area enclosed by solid lines is representative of the growth of bacterial colonies exposed to a preponderance of negative ions. The area enclosed by broken lines represents the growth pattern of the control. The axis of ordinates, as indicated, represents the colony diameter and the axis of abscissae the number of colonies. It was observed that the presence of an atmosphere of negative ions decidedly stimulated the growth rate of the bacteria Sarcina lutea, as compared with its growth rate, under similar non-ionized conditions, and further that this result was accentuated as the temperature of incubation was depressed relative to optimum.

FIGURE 5 graphically illustrates the effectiveness of the method when applied to bacteria subjected to a temperature seven degrees below optimum. As computed from the graph, the growth rate was stimulated approximately 23%, the mean diameter of the colonies being raised from 12.9 units to 15.9 units during a three day incubation period. Each unit of measurement is equivalent to 150 microns.

The techniques of the invention have been shown to be effective even at temperatures which are only slightly below optimum. FIGURE 6 for example illustrates the growth stimulation of bacteria grown in a negatively ionized atmosphere at a temperature only 3 degrees below optimum. These bacteria experienced a growth acceleration of approximately 10%, the mean diameter of the control colonies being 11.0 units as compared to a mean diameter of 12.0 units for colonies grown in air having a preponderance of artificially produced negative ions.

An effect similar to that discussed above was observed when using the mold *Aspergillus niger* (ATCC No. 6275), a representative species of the mold genus Aspergillus. FIGURE 7 graphically represents the results obtained when a surface culture strain of this mold was subjected to an environment rich in negative atmospheric ions for an incubation period of 70 hours. As will be observed, an extremely light inoculation was obtained, this being accomplished by allowing the inoculant spray to settle for 30 minutes and then exposing the plates for the comparatively short period of 15 seconds. The temperature of incubation was 16° C., this being considerably below the optimum growth temperature for the species. The growth stimulation under these conditions was approximately 10%, the mean diameter of the colonies changing from 9.5 mm. to 10.25 mm.

It was also discovered that negative ionization has an opposite or inhibitory effect on the spore germination of Penicillium molds. FIGURE 8 shows the test apparatus employed in conducting this phase of the investigation. Two 2000 cc. Erlenmeyer flasks 48 and 50 were used, each containing 250 cc. of Sabouraud dextrose broth sterilized at 15 lbs. pressure for 15 minutes. The broth in each flask was inoculated with 10 cc. of an 18 hour culture of *Penicillium luteum*. Flask 48 was further provided with an ionizer 52 of the type previously discussed, inserted in the neck portion of the flask and constructed and arranged to generate a preponderance of negative atmospheric ions within the flask enclosure 4. Both tubes were hermetically sealed; tube 50 serving as the control. To insure uniform exposure of the incubating cultures by the ionized air the flasks were mounted on a shaker 58 operating at 85 vibrations per minute. This produced sufficient agitation of the culture to insure its uniform exposure to the ionized air. The flasks were maintained at identical temperatures throughout the test by placement in an insulative enclosure of the type shown in FIGURE 3. At the end of the first 24 hour incubation period the vibrator was turned off and the flasks allowed to stand without agitation for a four day period. At the end of this time it was noted that there was about three times as much spore germination in the control flask as there was in the flask containing the negative ionizer. The beneficial aspects of this phase of the invention are immediately apparent when it is realized that mold growth, particularly in warm humid ambients is a particularly troublesome problem.

While we have described our invention utilizing specific means and embodiments we do not wish to be limited thereto for obvious modifications will occur to those skilled in the art without departing from the scope of the invention.

We claim:

1. The method of affecting the growth rate of *Penicillium luteum*, which comprises: incubating the selected microorganism, generating and maintaining within the incubating environment a preponderance of negative atmospheric ions, and subjecting the selected microorganism to said atmospheric ions to inhibit the growth rate of said microorganism.

2. The method of affecting the growth rate of aerobic and facultative aerobic microorganisms selected from the genera consisting of Sarcina and Aspergillus which comprises: incubating the selected microorganism at a temperature below that required for optimum growth; generating and maintaining within the incubating environment a preponderance of negative atmospheric ions; and subjecting said microorganism to said atmospheric ions to increase the growth rate of said microorganism over that normally obtaining under said depressed temperature conditions.

3. The method of controlling the growth rate of aerobic and facultative microorganisms selected from the genera consisting of Aspergillus and Sarcina which comprises: incubating the selected microorganism; generating and maintaining within the incubating environment a preponderance of negative atmospheric ions; and subjecting said microorganism to said atmospheric ions to increase the growth rate of said microorganism.

References Cited in the file of this patent

UNITED STATES PATENTS

| | | |
|---|---|---|
| 2,640,158 | Hicks | May 26, 1953 |
| 2,850,641 | Martin | Sept. 2, 1958 |
| 2,851,366 | Schaefer et al. | Sept. 9, 1958 |
| 2,920,969 | Stoddard | Jan. 12, 1960 |
| 2,955,076 | Gossling | Oct. 4, 1960 |